Feb. 16, 1943.  C. LOSE, JR  2,311,594
FILTER BED CLEANER
Filed Oct. 4, 1940
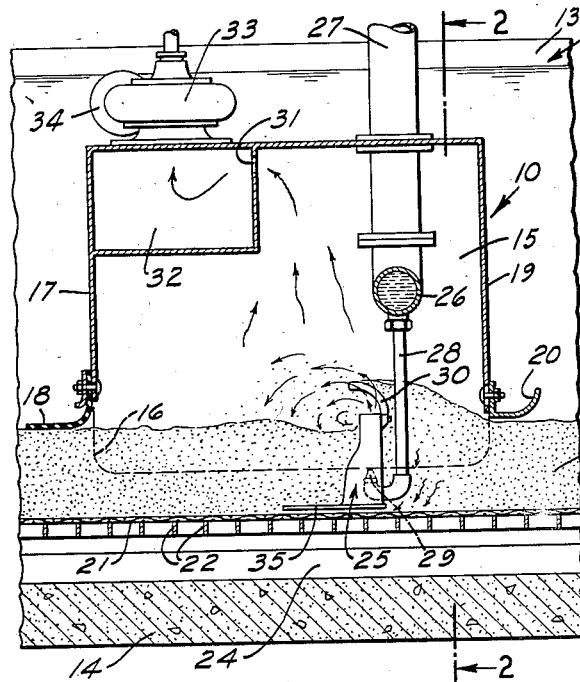
FIG. 1.
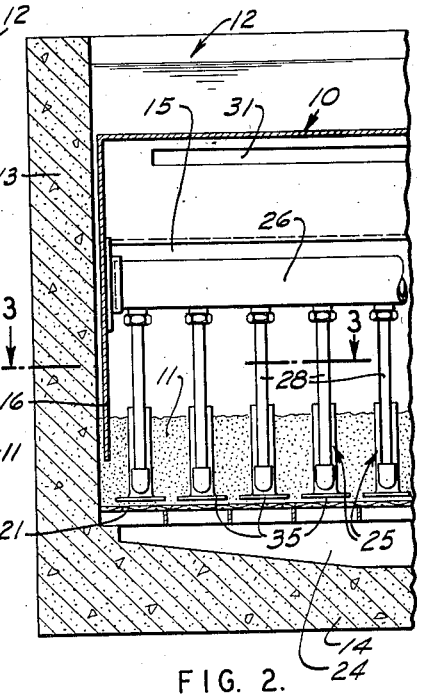
FIG. 2.
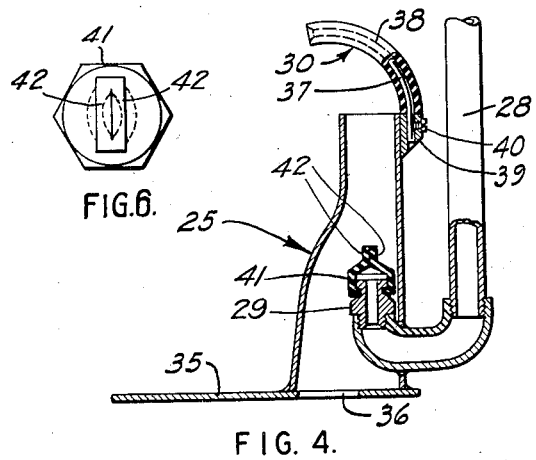
FIG. 6.
FIG. 4.
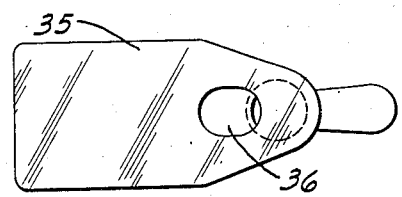
FIG. 5.
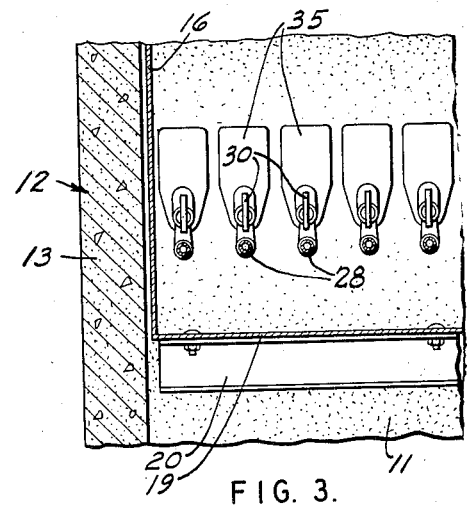
FIG. 3.
INVENTOR
CHARLES LOSE, JR.
BY Louis L. Ansart
his ATTORNEY Patented Feb. 16, 1943

2,311,594

UNITED STATES PATENT OFFICE 2,311,594

FILTER BED CLEANER

Charles Lose, Jr., Cranford, N. J.

Application October 4, 1940, Serial No. 359,656

10 Claims. (Cl. 210—128)

This invention relates to improvements in traveling cleaners for filter beds of granular material such as sand and more particularly to improvements in the hollow teeth of such a filter bed cleaner as disclosed in the prior application of John B. Goldsborough, Serial No. 319,405 filed February 17, 1940. This application is a continuation in part of my prior application Serial No. 329,026, filed April 11, 1940.

By means of a traveling filter bed cleaner of the type disclosed in said prior application, it has been feasible to maintain a filter bed of granular material such as sand in condition for continuous operation. As disclosed in said prior application, the granular material from the bottom of the filter bed is forced up through the hollow teeth and discharged into a caisson above the upper surface of the filter bed. During the operation of the traveling cleaner device, the granular material is scoured and cleaned both while passing upwardly through the hollow teeth and while settling on the filter bed from the dirty water above the bed, in which dirty water the solids removed from the granular material are suspended. Such dirty water is constantly removed from the upper portion of the caisson during the operation of the cleaner.

In the earlier forms of such hollow teeth, the upper ends of the teeth were turned downwardly thus resulting in a relatively severe abrasion of such parts of the hollow teeth by the sand, thus rendering the teeth of relatively short life. In many instances, the hollow teeth also had bends or curves in addition to the ones at the top and were thus subject to abrasion at such other points. According to said prior application, however, the teeth are made with substantially straight passages so that abrasion is very much reduced, and the stream of material emerging substantially vertically from the upper ends of the hollow teeth is deflected downwardly by various means, such as a single deflector for all of said teeth or individual deflectors attached to the hollow teeth at their forward sides and bent rearwardly and downwardly over the upper ends of the hollow teeth. Such deflectors are, however, of considerable breadth and are made of material which would be subject to abrasion by the granular material or sand and would have to be replaced fairly frequently.

An important object of the present invention is to provide improved traveling filter-bed cleaners. Another object of the invention is to provide an improved deflector for use at the top of the tooth. A further object of the invention is to provide an improved filter bed cleaner tooth to permit the use of an upwardly directed fluid jet nozzle while leaving a full throat to enable the free flow of sand from the bottom of the tooth past the nozzle. Another object of the invention is to provide a filter bed cleaner tooth, having an upwardly directed fluid jet nozzle, with means for preventing the entry into the nozzle of granular filter bed material when the flow of fluid through the nozzle is shut off.

In carrying out the present invention according to an approved form, each hollow tooth is provided at its upper end with an easily replaceable finger comprising a sufficiently strong core attached to the upper end of the tooth at the forward side thereof and curved rearwardly and downwardly over the opening at the top of said tooth, the finger being provided with abrasion-resisting material such as rubber. The width of the deflector may be less than the width of the outlet.

Preferably the upward movement of sand through each hollow tooth is obtained providing a stream of fluid under pressure through an upwardly directed nozzle inside such hollow tooth and located at the forward side thereof. This nozzle is arranged substantially axially with a substantially straight upper part of the passage through the hollow tooth, so that granular material can pass directly from the nozzle to the outlet of the tooth. In order to provide a full throat and therefore free passage past the nozzle, the lower part of the tooth and the passage therein are so shaped as to provide a full throat at the nozzle and to permit free passage of the granular material from the lower end of the tooth past the nozzle to the straight upper part of the passage.

At its lower end each tooth may be provided with a rearwardly extending baffle to assist in controlling the flow of sand to a lower part of the tooth. This baffle may be in the form of a plate extending across the bottom of the tooth and may be provided with an opening to the rear of the nozzle so as to enable the granular material to flow freely past the nozzle. Shutting off the stream of liquid tends to cause a back flow of sand and liquid which may cause the granular material or sand to pass into and clog the nozzle. This trouble may be obviated by placing on the tip of the nozzle a device which will permit the jet to pass freely out of the nozzle but will prevent the passage of material into the nozzle in the opposite direction. The arrangement just described has been found to work very satisfactorily.

Further objects, features and advantages will appear upon consideration of the following detailed description and of the drawing in which:

Figure 1 is a vertical section of a cleaner embodying the present invention;

Figure 2 is a section along the line 2—2 of Figure 1;

Figure 3 is a section on the line 3—3 of Figure 2;

Figure 4 is a sectional view of one of the teeth;

Figure 5 is a bottom plan view of the lower end of the tooth with a baffle attached thereto; and Figure 6 is a top plan view of the nozzle showing a check device thereon.

Although the filter bed cleaners of the present invention may be used to clean filter beds arranged in tanks of various shapes, said cleaners are particularly adapted for use in filter channels of substantially the same width as the cleaners, for example, endless filter channels such as disclosed in the patent to Streander 2,086,629, July 13, 1937.

Referring to the drawing a filter bed cleaner 10 embodying one form of the present invention is illustrated as arranged to travel to the right (Fig. 1) for cleaning a granular filter bed 11 in a filter channel or tank 12 having side walls 13 and a bottom 14. It should be understood that the granular material of the filter bed is usually sand.

The filter bed cleaner 10 may comprise a caisson or chamber 15 having side walls 16 projecting downwardly into the granular material of the bed 11, a rear wall 17 provided at its bottom with a rearwardly extending flap 18 to effect a seal with the top of the filter bed 11 and to smooth down the granular material or sand at any location as the rear wall of the cleaner leaves that locality, a front wall 19 having at its bottom a forwardly and upwardly extending lip 20 adapted to ride over any solids collected on the surface of the filter bed and also to press down any raised material at the front of the caisson so that it will pass under said lip 20. The filter bed 11 may be mounted on a usual screen 21 resting on an openwork support 22, beneath which is a drainage channel 24 to carry off the liquid passing through the filter bed.

During the forward movement of the cleaner 10 the sand is stirred and agitated by a series of hollow teeth 25, which tend to pile up the sand at the front thereof. At the same time fluid, such as water, supplied to a manifold 26 through a pipe 27 passes from the manifold through pipes 28 to nozzles 29 directed upwardly inside the hollow teeth 25. The fluid, such as water passing upwardly through the hollow teeth 25 causes sand to be drawn into the bottom of each tooth and discharged at the top where it is deflected rearwardly and downwardly by fingers or deflectors 30 attached to the teeth at the forward sides thereof.

In passing upwardly through the teeth 25 and downwardly towards the surface of the bed at the rear of the hollow teeth, the sand is scoured and cleaned and while the scoured sand is again deposited on the filter bed, the waste material separated from the sand is left in the dirty water in the caisson or chamber 15. Obviously, as the cleaner travels along the filter bed, the different parts of the filter bed will be treated in succession to clean the same.

The dirty water in the caisson must be withdrawn therefrom in order to permit continuation of effective cleaning. As illustrated the dirty water is drawn rearwardly through an inlet 31 in the upper part of the front wall of a suction chamber 32 in the upper rear part of the caisson 15. The high location of the opening or inlet 31 guards against the drawing of sand into the tank or box 32. From the box 32 the dirty water is drawn from the caisson by means of a rotary pump 33 and discharged therefrom through a duct 34. The apparatus thus far described is similar in various respects to the cleaner of said prior application.

According to the illustrative form of cleaner embodying the present invention, each tooth is supported by means of a corresponding branch supply pipe 28 and the connection thereof with the nozzle 29. Also in order to provide a full throat adjacent the nozzle 29, the rear side of the tooth 25 is flared outwardly so as to increase the cross sections of the teeth which include the nozzles 29. Preferably the lower part of each tooth is kept narrow. It should be understood that by providing a free path for the sand and liquid past the nozzle 29 the resistance to flow through the teeth and also the abrasion of the inner surface of said tooth will be kept low. There are no sharp curves and the sand is passed readily through the teeth. The inner surface of the passage in each tooth 25 is so shaped that the sand moves vertically at the bottom and rear of each tooth and then is gradually moved forwardly until it enters the path of liquid moving upwardly from a nozzle 29 and is discharged from the upper end of the tooth. Obviously, this arrangement will substantially avoid abrasion.

In order to control the flow of sand into the bottom of the hollow teeth 25, such hollow teeth are provided at their lower ends with baffles or plates 35 which control the passage of the sand to the lower ends of the hollow teeth 25. As shown in Figure 4, these baffles narrow towards distinct spaces between which sand may pass downwardly to the open lower ends of the teeth, sand being taken from the pile accumulated at the front of the teeth.

Each nozzle 29 is at the forward side of the corresponding tooth so that the flow of liquid from the nozzle will tend to drive material directly upward through the hollow teeth. Also each baffle 35 extending across the bottom of the tooth 25 is provided with an opening 36 adjacent the flared rear wall of each hollow tooth and rearwardly of the corresponding nozzle 29 so that the material will pass upwardly at the rear of the corresponding nozzle 29 and then will be shifted forwardly over the nozzle. Thus the sand will pass readily through the lower end of the tooth until it passes over the nozzle and then will be blown directly out of the top of the tooth to engage the deflector 30 and be turned downwardly towards the upper surface of the filter bed. Furthermore the deflectors or fingers 30 are narrower than the openings at the upper ends of the hollow teeth 25 so that the sand will be projected sidewise in addition to being deflected rearwardly and downwardly.

Inasmuch as a stream of sand is forced directly against each of these deflectors 30, the deflector may be made with an internal core or strengthening member 37 of suitable material such as metal, and a covering 38 of abrasion-resisting material, such as rubber. Also each deflector 30 may be secured in position by inserting a free end of the core 37 into an opening in a lug 39 and securing in position by a binding screw 40 engaging a flat on the core 37. The deflector 30 is subjected to the greatest abrasive action, but the core is protected by the protective covering 38 and when this is worn out the deflector can readily be replaced.

While the structure thus far described was found to be very effective in regular use, it was found that, when the washing of the sand was stopped and no more liquid was supplied to the nozzles 29, the granular material or sand in the nozzle settled toward the bed and in certain instances entered nozzles 29 and these nozzles were clogged when liquid under pressure was against supplied to the nozzles. There was then presented the problem of providing a check device, in the nature of a check device, which would not interfere with the flow of liquid outwardly through a nozzle but would prevent the flow of granular material into this nozzle when the supply of liquid under pressure was shut off.

Eventually this problem was solved by placing over the outlet of each of said nozzles, a check device 41 (Figs. 4 and 6) in the form of a nipple of elastic material, such as rubber. This nipple has a generally cylindrical body portion fitting over the end of the nozzle, and is flattened at its outer end to provide two flat lips 42. When fluid under pressure is supplied through the nozzle, the lips are forced apart and the liquid passes freely therethrough. When the supply of liquid under pressure ceases, the lips come together again and downward flow of granular material into the nozzle is prevented.

It should be apparent that important features of the sand-cleaning tooth of the present invention reside in an upwardly directed nozzle in the lower part of a substantially straight passage leading from an inlet at the lower end of the tooth to an outlet at the upper end, a deflector over the upper end of the tooth, and a check device on the outlet of the nozzle to prevent the flow of sand or other material into the nozzle.

It should be understood that various features may be changed and that certain features may be used without others, without departing from the true spirit and scope of the invention.

What I claim is:

1. The combination with an upright hollow tooth for a filter bed cleaner of the class described, said hollow tooth having a lower inlet end into which may be drawn granular material from the bottom of a filter bed, an upper outlet end from which the granular material may be discharged, means within said tooth and between said inlet end and outlet end for forcing the granular material through the tooth, of a deflector over the upper end of said tooth attached at one end to the side of the tooth and curving over said outlet to deflect the granular material laterally and downwardly, and a yieldable abrasion resisting member protecting the deflector.

2. The combination with an upright hollow tooth for a filter bed cleaner of the class described, said hollow tooth having a lower inlet end into which may be drawn granular material from the bottom of a filter bed, an upper outlet end from which the granular material may be discharged, means within said tooth and between said inlet end and outlet end for forcing the granular material through the tooth, of a deflector over the upper end of said tooth attached at one end to the side of the tooth and curving over said outlet to deflect the granular material laterally and downwardly, and a yieldable abrasion resisting member protecting the deflector, said deflector being narrower than the outlet opening.

3. A hollow tooth for a filter bed cleaner of the class described having a substantially axial passage therethrough and at an intermediate point of the passage a nozzle having an axis extending in the same general direction as that of the passage and directed toward the discharge end of said tooth; said passage having an inlet to one side of the axis of said nozzle, the side of said passage adjacent to said nozzle being substantially straight and the opposite side of said passage extending upwardly and then curving toward such substantially straight side to direct the stream from said inlet over said nozzle and then extending substantially parallel to such straight side adjacent the nozzle thereby providing an inlet portion of said passage decreasing in cross section from its bottom to its top above said nozzle and a substantially straight outlet portion above and coaxial with said nozzle.

4. A hollow tooth for a filter bed cleaner of the class described, said hollow tooth having a substantially axial passage therethrough with an outlet at its top and an inlet at its bottom and comprising an upwardly directed fluid nozzle at one side of said passage in the lower part thereof, the lower part of said passage being increased in cross-section to provide a full flow past said nozzle, the side of said pasasge adjacent to said nozzle being straight from the bottom to the top of said tooth and the opposite side of said passage being flared outwardly toward its lower end to provide for a full flow past said nozzle.

5. A hollow tooth for a filter bed cleaner of the class described, said hollow tooth having a substantially axial passage therethrough with an outlet at its top and an inlet at its bottom and comprising an upwardly directed fluid nozzle at one side of the lower part of said passage, and a bottom for said hollow tooth having an opening to admit granular material from said bed at one side of said nozzle, the side of said passage adjacent to said nozzle being straight and the opposite side being substantially parallel to the first mentioned side above said nozzle but then inclining away from the first mentioned side and downwardly to increase the cross-section of the lower part of said passage and give a full flow of material past said nozzle.

6. A hollow tooth for a filter bed cleaner of the class described, said hollow tooth having a passage with an inlet at one end of the tooth and an outlet at the other end and comprising a nozzle located at one side of a straight line through said inlet and outlet and with its axis directed toward said outlet, the portion of said passage between said nozzle and outlet being substantially straight and coaxial with said nozzle, the inlet being on one side of the axis of said nozzle.

7. A tooth for a filter bed cleaner of the class described, said tooth having a hollow body with a passage extending therethrough from the bottom to the top and having a substantially straight front side and a rear side with its upper portion substantially parallel to the front side and the remainder curving gradually rearwardly and then downwardly, thus providing an upper substantially straight outlet portion and a lower portion increasing in cross-section toward its bottom, an upwardly directed nozzle at the front side of said passage immediately beneath said